US011977198B2

(12) United States Patent
AlDubaisi et al.

(10) Patent No.: US 11,977,198 B2
(45) Date of Patent: May 7, 2024

(54) ISOFREQUENCY VOLUMES RATIO WORKFLOW TO DETECT GAS RESERVOIRS IN 3D DOMAIN

(71) Applicant: SAUDI ARABIAN OIL COMPANY, Dhahran (SA)

(72) Inventors: Hassan A. AlDubaisi, Anak (SA); Taher M. Sodagar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/064,025

(22) Filed: Oct. 6, 2020

(65) Prior Publication Data
US 2022/0107435 A1    Apr. 7, 2022

(51) Int. Cl.
*G01V 1/30*    (2006.01)
(52) U.S. Cl.
CPC .............. *G01V 1/307* (2013.01); *G01V 1/302* (2013.01); *G01V 2210/22* (2013.01); *G01V 2210/63* (2013.01)
(58) Field of Classification Search
CPC .... G01V 1/307; G01V 1/302; G01V 2210/22; G01V 2210/63
USPC .......................................................... 702/14
See application file for complete search history.

(56) References Cited

U.S. PATENT DOCUMENTS

| | | | |
|---|---|---|---|
| 4,363,112 A | 12/1982 | Widrow | |
| 5,671,136 A | 9/1997 | Willhoit, Jr. | |
| 5,850,622 A | 12/1998 | Vassiliou et al. | |
| 6,052,333 A | 4/2000 | Williams | |
| 6,131,071 A * | 10/2000 | Partyka | G01V 1/32 702/16 |
| 8,213,261 B2 | 7/2012 | Imhof et al. | |
| 9,279,897 B2 | 3/2016 | Zuercher | |
| 2003/0022626 A1* | 1/2003 | Miquel | H04B 7/15585 455/24 |
| 2005/0038604 A1* | 2/2005 | Marin | G01V 1/30 702/14 |
| 2006/0235666 A1 | 10/2006 | Assa et al. | |
| 2009/0175126 A1* | 7/2009 | Lambert | G01V 1/32 367/59 |

(Continued)

FOREIGN PATENT DOCUMENTS

| | | |
|---|---|---|
| CA | 1240026 A | 8/1988 |
| CN | 109001800 A | 12/2018 |

(Continued)

OTHER PUBLICATIONS

English translation of CN 109116419, Jan. 2019. (Year: 2019).*

(Continued)

*Primary Examiner* — Michael P Nghiem
(74) *Attorney, Agent, or Firm* — Osha Bergman Watanabe & Burton LLP (57) ABSTRACT

A method that includes transforming a relative amplitude preserved 3D seismic volume acquired in the time-domain into a plurality of isofrequency volumes, extracting from the plurality of isofrequency volumes a first isofrequency spectral amplitude volume and a second isofrequency spectral amplitude volume. The method further includes determining an attribute volume from the two isofrequency spectral amplitude volumes, and determining a presence of gas in a subterranean region of interest based on the attribute volume.

14 Claims, 7 Drawing Sheets

(56) References Cited

U.S. PATENT DOCUMENTS

| | | | | |
|---|---|---|---|---|
| 2011/0147004 | A1* | 6/2011 | Neelamani | G01V 1/36 703/2 |
| 2011/0218737 | A1* | 9/2011 | Gulati | G01V 1/28 345/419 |
| 2011/0295510 | A1 | 12/2011 | Gulati | |
| 2012/0090834 | A1 | 4/2012 | Imhof et al. | |
| 2012/0257476 | A1* | 10/2012 | Muhl | G01V 1/325 367/38 |
| 2014/0372044 | A1* | 12/2014 | Jiao | G01V 1/282 702/16 |
| 2015/0138915 | A1 | 5/2015 | Khan et al. | |
| 2015/0168574 | A1 | 6/2015 | Wallet et al. | |
| 2016/0086079 | A1* | 3/2016 | De Stefano | G01V 11/00 706/12 |
| 2016/0313460 | A1 | 10/2016 | Berron et al. | |
| 2018/0024262 | A1 | 1/2018 | Madof | |
| 2018/0024263 | A1 | 1/2018 | Aarre et al. | |
| 2018/0217284 | A1* | 8/2018 | Zhao | G06F 17/14 |
| 2020/0166664 | A1 | 5/2020 | Bin Gubair et al. | |
| 2020/0183031 | A1* | 6/2020 | Denli | G01V 1/301 |
| 2020/0191985 | A1 | 6/2020 | Kristiansen et al. | |
| 2020/0333491 | A1* | 10/2020 | Bekara | G01V 1/30 |
| 2020/0348432 | A1 | 11/2020 | Sodagar | |
| 2021/0215842 | A1* | 7/2021 | Liu | G01V 1/345 |
| 2021/0278557 | A1* | 9/2021 | Awfi | G01V 1/362 |

FOREIGN PATENT DOCUMENTS

| | | | | |
|---|---|---|---|---|
| CN | 109116419 | A * | 1/2019 | G01V 1/306 |
| CN | 111077570 | A | 4/2020 | |
| CN | 111123354 | A | 5/2020 | |
| CN | 111239808 | A | 6/2020 | |
| RU | 2007108956 | A | 9/2008 | |
| WO | 2008059450 | A2 | 5/2008 | |
| WO | 2011109839 | A2 | 9/2011 | |
| WO | 2019241062 | A1 | 12/2019 | |

OTHER PUBLICATIONS

Princeton University, Definition of Wavelet Transform, Apr. 4, 2014. (Year: 2014).*

Castagna et al.; "Instantaneous spectral analysis: Detection of low-frequency shadows associated with hydrocarbons." The Leading Edge; vol. 22; Issue 2; Feb. 1, 2003; pp. 120-127 (6 pages).

Chopra, S. & Marfurt, K. J., "Seismic Attributes for Prospect Identification and Reservoir Characterization" Society of Exploration Geophysicists; Chapter 6; Jul. 7, 2007; pp. 123-151 (29 pages).

Yilmaz, O.; "Seismic Data Analysis"; Society of Exploration Geophysicists; Chapter 11; vol. 2; 2001; pp. 1793-2027 (235 pages).

Odebeatu et al.; "Application of spectral decomposition to detection of dispersion anomalies associated with gas saturation"; The Leading Edge; vol. 25; Issue 2; Feb. 1, 2006; pp. 206-210 (5 pages).

Sodagar, T.; "Revelation of the Triassic Gas Potential with Insight of Iso Frequency Spectral Decomposition in Saudi Arabia's Offshore", SPE-172625-MS, Soecity of Petroleum Engineers, Mar. 8, 2015, pp. 1-16 (16 pages).

Gao, W et al.; "An improved pre-stack hydrocarbon detection method based on frequency decomposition and spectral decomposition", Society of Exploration Geophysicists; Aug. 27, 2018; pp. 3317-3321 (5 pages).

Li, Y. et al.; "Hydrocarbon detection for Ordovician carbonate reservoir using amplitude variation with offset and spectral decomposition", Interpretation; vol. 4; No. 3; Aug. 1, 2016; pp. SN11-SN30 (20 pages).

Kiaodong, W. et al.; "Application of spectral decomposition in hydrocarbon detection", SEG Technical Program Expanded Abstracts; Jan. 1, 2011; pp. 1041-1045 (5 pages).

Non-Final Office Action issued in corresponding U.S. Appl. No. 17/148,611 dated Oct. 6, 2021 (20 pages).

Burnett et. al.; "Application of spectral decomposition to gas basins in Mexico"; The Leading Edge; vol. 22; Issue 11; Nov. 1, 2003; pp. 1130-1134 (5 pages).

Chapman et. al.; "The influence of abnormally high reservoir attenuation on the AVO signature"; The Leading Edge; vol. 24; Issue 11; Nov. 1, 2005; pp. 1120-1125 (5 pages).

Chen et. al.; "Spectral-decomposition response to reservoir fluids from a deepwater West Africa reservoir"; Geophysics; vol. 73, No. 6; Oct. 24, 2008; pp. C23-C30 (8 pages).

Deng et al.; "Application of Spectral Decomposition to Detect Deepwater Gas Reservoir"; Society of Exploration Geophysicists; Jan. 1, 2007; pp. 1427-1431 (5 pages).

Partyka et. al.; "Interpretational applications of spectral decomposition in reservoir characterization"; vol. 18; Issue 3; Mar. 1, 1999; pp. 353-360 (5 pages).

Rapoport et. al.; "Direct detection of oil and gas fields based on seismic inelasticity effect"; The Leading Edge; vol. 23; Issue 3; Mar. 1, 2004; pp. 276-278 (3 pages).

Sodagar, T.; "Revelation of the Triassic Gas Potential with Insight of Iso Frequency Spectral Decomposition in Saudi Arabia's Offshore", SPE-172625-MS; Society of Petroleum Engineers; Mar. 8, 2015 (16 pages).

Wilson, Adam et al., "Frequency-dependent AVO inversion", SEG Houston 2009 International Exposition and Annual Meeting, Oct. 2009, pp. 341-345 (5 pages).

Bouchaala, Fateh and Claude Guennou, "Estimation of viscoelastic attenuation of real seismic data by use of ray tracing software: Application to the detection of gas hydrates and free gas", Comptes Rendus Geoscience, ScienceDirect, Elsevier Masson SAS, vol. 344, Mar. 2012, pp. 57-66 (10 pages).

Chand, Shyam and Tim. A. Minshull, "The effect of hydrate content on seismic attenuation: A case study for Mallik 2L-38 well data, Mackenzie delta, Canada", Geophysical Research Letters, American Geophysical Union, vol. 31, L14609, 2004, pp. 1-4 (4 pages).

Priest, Jeffrey A. et al., "Attenuation of seismic waves in methane gas hydrate-bearing sand", Geophysical Journal International, vol. 164, Issue 1, Jan. 2006, pp. 149-159 (11 pages).

Wang, Yanghua, "Seismic time-frequency spectral decomposition by matching pursuit", Geophysics, Society of Exploration Geophysicists, vol. 72, No. 1, Jan.-Feb. 2007, pp. V13-V20 (8 pages).

Wang, Zhiguo et al., "3D seismic attributes for a tight gas sand reservoir characterization of the eastern Sulige gas field, Ordos Basin, China", Geophysics, Society of Exploration Geophysicists, vol. 80, No. 2, Mar.-Apr. 2015, pp. B35-B43 (9 pages).

Wang, Zhiguo et al., "Application of 3D seismic attributes to optimize the placement of horizontal wells within a tight gas sand reservoir, Ordos Basin, China", Geophysics, Society of Exploration Geophysicists, vol. 81, No. 3, May-Jun. 2016; pp. B77-B86 (10 pages).

Wood, Warren T. et al., "In Situ Measurements of P-Wave Attenuation in the Methane Hydrate-and Gas-Bearing Sediments of the Blake Ridge", Proceedings of the Ocean Drilling Program, Scientific Results, vol. 164, 2000, pp. 265-272 (8 pages).

Yang, Zhifang et al., "Tight gas detection based on the reflectivity dispersion technology", Petroleum Exploration and Development, Research Institute of Petroleum Exploration and Development, ScienceDirect, Elsevier B.V., vol. 41, Issue 5, Oct. 2014, pp. 628-633 (6 pages).

International Search Report and Written Opinion issued in Application No. PCT/US2021/012517, dated Apr. 22, 2022 (15 pages).

L. Lifeng et al.; "Seismic attributes and integrated prediction of fractured and caved carbonate reservoirs in the Tarim Basin, China", Petroleum Science; vol. 8; 2011; pp. 455-461 (7 pages).

International Search Report and Written Opinion issued in Application No. PCT/US2021/053551, dated Jan. 21, 2022 (12 pages).

T. M. Sodagar, "Iso Frequency Spectral Decomposition Ratio Technology Workflow for Gas Carbonate Field Developments and Characterization", First EAGE Reservoir Characterization and Modelling Workflows for Giant Carbonate Field; Feb. 18, 2019; pp. 1-4 (4 pages).

P. Guizada et al.; "Application of Underbalanced Coiled Tubing Drilling Technology to Enhance Gas Production in Deep Carbonate Reservoirs", SPE-192786-MS; Society of Petroleum Engineers; Nov. 2018; pp. 1-8 (8 pages).

* cited by examiner

ISOFREQUENCY VOLUMES RATIO WORKFLOW TO DETECT GAS RESERVOIRS IN 3D DOMAIN

BACKGROUND

In some situations, a portion of the reservoir within the subterranean region of interest may contain a gas deposit. In some situations, it may be desirable to detect the gas deposit using a seismic survey. Portions of the reservoir containing a gas deposit may affect the characteristics of the reflected seismic waves and refracted seismic waves differently from portions of the reservoir contains fluids, whether oil or water. In some situations, it may be desirable to drill a wellbore into a gas deposit to produce the gas to the surface. Such a wellbore may be a vertical wellbore or may be a horizontal wellbore constructed using geosteering methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes transforming a relative amplitude preserved 3D seismic volume acquired in the time-domain into a plurality of isofrequency volumes, extracting from the plurality of isofrequency volumes a first isofrequency spectral amplitude volume and a second isofrequency spectral amplitude volume. The method further includes determining an attribute volume from the two isofrequency spectral amplitude volumes, and determining a presence of gas in a subterranean region of interest based on the attribute volume.

In general, in one aspect, embodiments relate to a system including a seismic processor composed of a computer processing unit capable of executing the instructions stored in the non-transitory computer storage medium. The seismic processor transforms a relative amplitude preserved 3D seismic volume acquired in the time-domain into a plurality of isofrequency volumes and extracts from the plurality of isofrequency volumes a first isofrequency spectral amplitude volume and a second isofrequency spectral amplitude volume. The seismic processor further calculates an attribute volume from the two isofrequency spectral amplitude volumes, and interprets anomalies in the attribute volume as indicative of a presence of gas.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
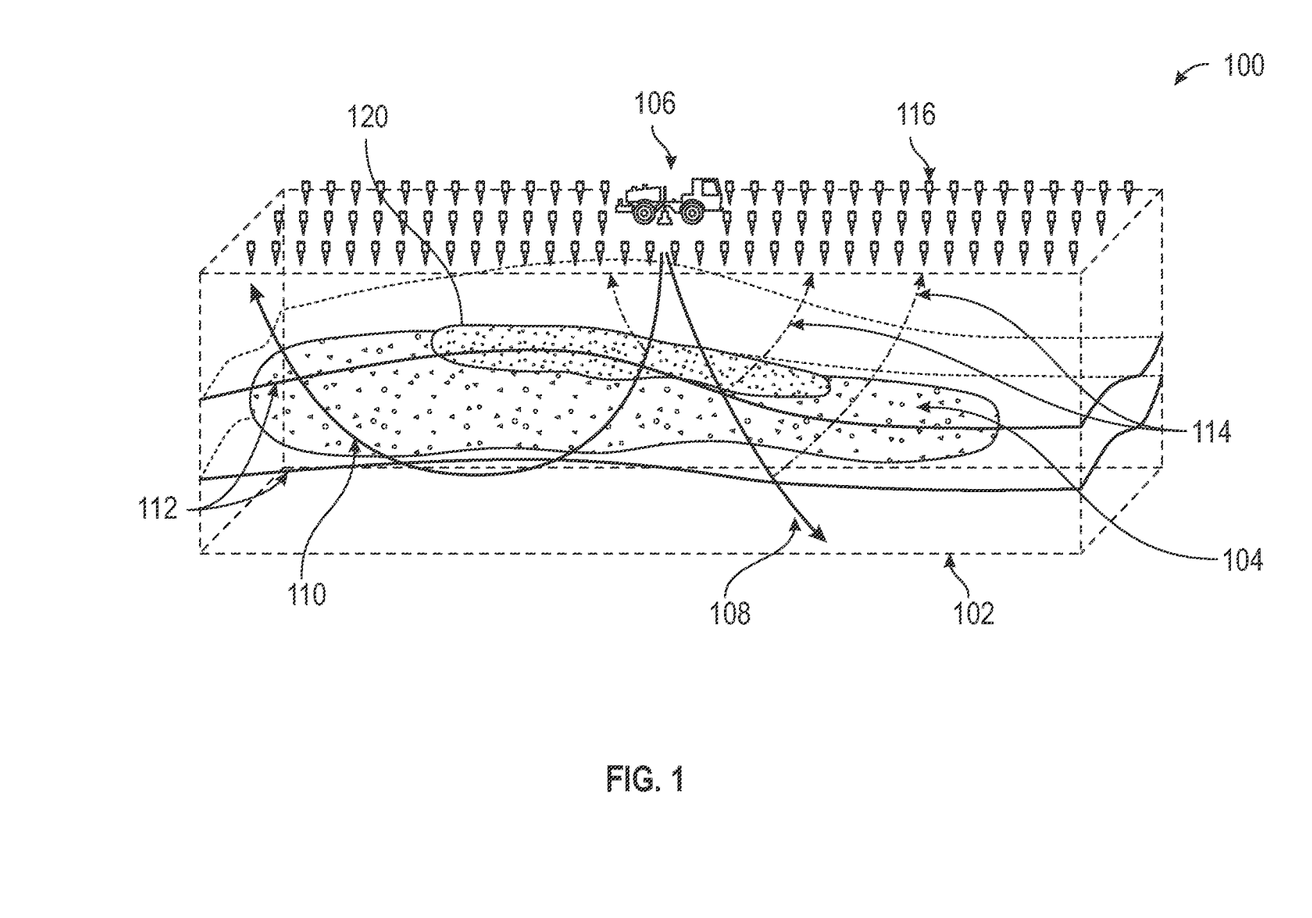
FIG. 1 depicts a seismic survey in accordance with one or more embodiments.

FIG. 1 shows a seismic survey (100) of a subterranean region of interest (102), which may contain a reservoir (104), may utilize a seismic source (106) that may generate radiated seismic waves (108). The radiated seismic waves (108) may return to the surface as refracted seismic waves (110), or may be reflected by geological discontinuities (112) and return to the surface as reflected seismic waves (114). At the surface, the refracted seismic waves (110) and reflected seismic waves (114) may be detected by seismic receivers (116).

In some embodiments, the refracted seismic waves (110) and reflected seismic waves (114) generated by a single activation of the seismic source (106) may be recorded by a seismic receiver (116) as a time-series representing the amplitude of ground-motion at a sequence of discreet times. The seismic receivers (116) may be positioned at a plurality of seismic receiver locations which we may denote $(x_r, y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes $(x_r, y_r, t)$ where $(x_r, y_r)$ represents the location of the seismic receiver (116) and t delimits the time sample at which the amplitude of ground-motion was measured.

However, a seismic survey (100) may include recordings of seismic waves generated by a seismic source (106) that may be positioned at a plurality of seismic source locations which we may denote $(x_s, y_s)$. Thus, the seismic volume for a seismic survey (100) may be resented as a five-dimensional volume, denoted $(x_s, y_s, x_r, y_r, t)$.

Figure 2:
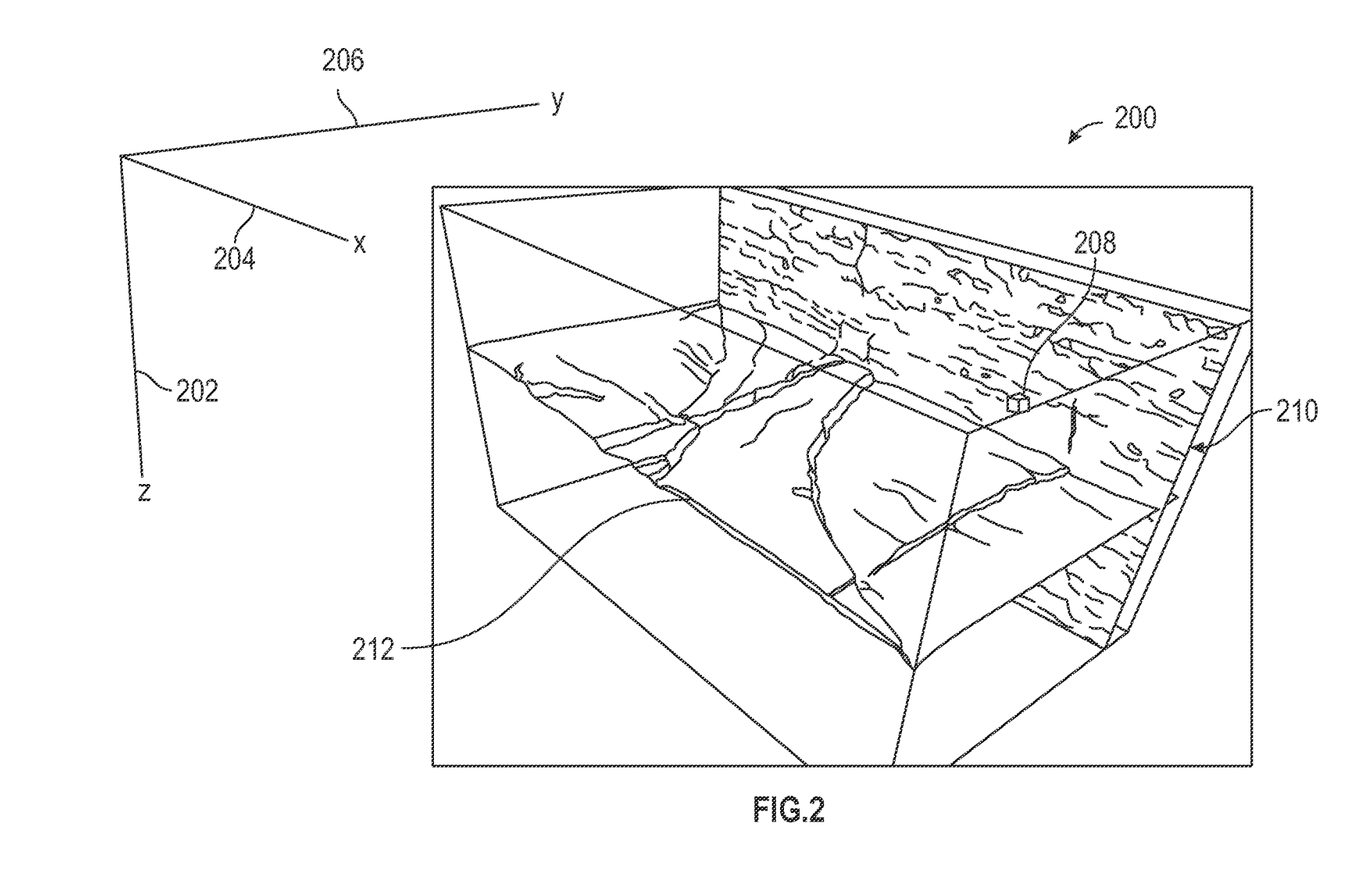
FIG. 2 shows a relative amplitude preserved 3D seismic volume in accordance with one or more embodiments.

FIG. 2 shows a 3D seismic volume in accordance with some embodiments. Seismic processing reduces a five-dimensional seismic volume produced by a seismic survey (100) to a 3D seismic volume (200) with one depth dimension (202), a first horizontal dimension (204) orthogonal to a second horizontal direction (206) representing a 3D image of the subterranean region of interest. Seismic processing performs this reduction from a five-dimensional seismic volume to a 3D seismic volume by correcting the recorded time of seismic waves for the time of travel ("migration") from the seismic source (106) to the seismic receiver (116) and summing ("stacking") samples over two space dimensions.

According to some embodiments, the migration is performed after approximating the velocity of seismic wave propagation as a function only of depth position, but not of horizontal position. Migration using this approximation is called "time-migration." According to some embodiments, the migration is performed without constraining the manner in which the velocity of seismic wave propagation varies. Migration using this approximation is called "depth-migration."

Thus, there are four possible combinations of the stacking and migration processes. Stacking before migration may produce "post-stack time-migration" if time-migration is used, and "post-stack depth-migration" if depth-migration is used. Migrating before stacking may produce "pre-stack time-migration" if time-migration is used, and "pre-stack depth-migration" if depth-migration is used. Each combination may be a relative amplitude preserved 3D seismic volume (200) representing a 3D image of the subterranean region of interest. FIG. 2 depicts a 2-D slices through a three dimensional seismic volume. A 3D pixel ("voxel") (208) of the 3D seismic volume (200) may have a value representing an estimate of an attribute of the subterranean volume of interest at the position of the voxel. For example, the attribute may be without limitation, a seismic wave reflection amplitude, or an isofrequency amplitude, or a coherence value. FIG. 2 shows a two-dimensional "2D" vertical slice (210) and a 2D horizontal slice (212) though the 3D seismic volume (200).

Figure 3:
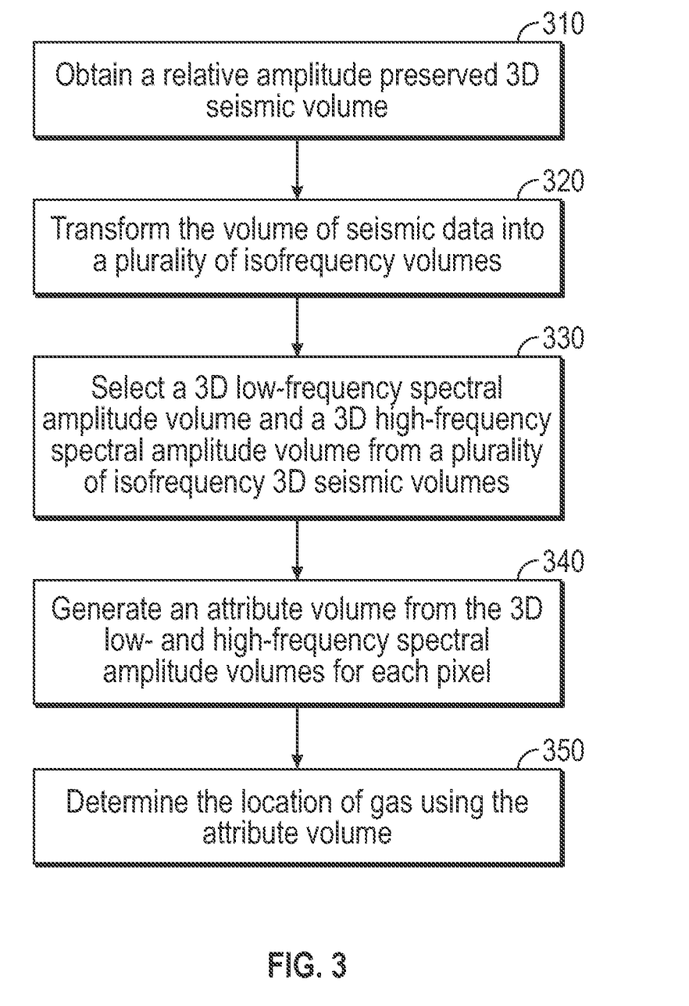
FIG. 3 a workflow in accordance with one or more embodiments.

FIG. 3 shows a workflow in accordance with some embodiments. In Block 310, a relative amplitude preserved 3D seismic volume (200) resulting from processing a seismic survey (100) for a subterranean region of interest is obtained. This seismic volume (200) may be a post-stack time-migration, a post-stack depth-migration, a pre-stack-time migration, or a pre-stack depth-migration.

In Block 320 the relative amplitude preserved 3D seismic volume (200) is transformed into a plurality of isofrequency volumes. According to some embodiments, this transformation may be performed by applying a short-time window Fourier transform along the depth axis of the relative amplitude preserved 3D seismic volume (200). According to some embodiments, this transformation may be performed by applying a Gabor transform along the depth axis of the relative amplitude preserved 3D seismic volume (200). According to some embodiments, this transformation may be performed by applying a Continuous Wavelet transform along the depth axis of the relative amplitude preserved 3D seismic volume (200). According to some embodiments, this transformation may be performed by applying a Discrete Wavelet transform along the depth axis of the relative amplitude preserved 3D seismic volume (200). Other methods for transforming the relative amplitude preserved 3D seismic volume (200) into a plurality of isofrequency volumes may be apparent to one skilled in the art.

Block 320 may also include, in accordance to some embodiments, the application of spatial filters to the the relative amplitude preserved 3D seismic volume. The result of the application of spatial filters may include, without limitation, the reduction or removal of noise spikes, the removal, or outliers, or the increase in spatial smoothness of the relative amplitude preserved 3D seismic volume. Block 320 may also include, in accordance to some embodiments, the application of frequency filters to the relative amplitude preserved 3D seismic volume. The result of the application of spatial filters may include, without limitation, the reduction or removal of noise spikes, the removal, or outliers, or the increase in spatial smoothness of the relative amplitude preserved 3D seismic volume.

In Block 330, in accordance with some embodiments, a plurality of isofrequency 3D spectral amplitude volumes may be generated from the the relative amplitude preserved 3D seismic volume. From this plurality of isofrequency 3D spectral amplitude volumes two isofrequency 3D spectral amplitude volumes may be selected. One isofrequency 3D spectral amplitude volume may be a low-frequency spectral amplitude volume and one isofrequency 3D spectral amplitude volume may be a high-frequency spectral amplitude volume.

The choice of the frequencies of the low-frequency, and high-frequency spectral amplitude volumes may be based, in part, upon the spatial smoothness of the isofrequency 3D spectral amplitude volume, or upon the signal-to-noise ratio of the isofrequency 3D spectral amplitude volume. Typically, the optimum low frequency and, in particular, the optimum high frequency values are lower for reservoirs located at greater depth because of the preferential absorption of higher frequencies during propagation of seismic waves through the earth above the reservoir.

In Block 340, according to some embodiments, an attribute volume may be generated from the 3D low-frequency spectral amplitude volume and the 3D high-frequency spectral amplitude volume. This attribute volume may be generated on a voxel-by-voxel basis, such that one voxel from the 3D low-frequency spectral amplitude volume and one voxel from the 3D high-frequency spectral amplitude volume uniquely determines one voxel in the 3D attribute volume. In other embodiments, a plurality of voxels from the 3D low-frequency spectral amplitude volume and a plurality of voxels from the 3D high-frequency spectral amplitude volume may contribute to one, or to a plurality of voxels in the 3D attribute volume.

In some embodiments, the attribute volume may be calculated on a voxel-by-voxel basis by calculating the ratio of a 3D low-frequency spectral amplitude volume to a 3D high-frequency spectral amplitude volume. In some embodiments, the attribute volume may be calculated on a voxel-by-voxel basis by calculating the ratio of a 3D high-frequency spectral amplitude volume to a 3D low-frequency spectral amplitude volume. In other embodiments, the attribute volume may be calculated on a voxel-by-voxel basis by calculating a product of a value of at least one voxel in the first isofrequency spectral amplitude volume and a value of at least one voxel in the second isofrequency spectral amplitude volume, for example by calculating the product of a 3D high-frequency spectral amplitude volume to a 3D low-frequency spectral amplitude volume. In some embodiments, the attribute volume may be calculated on a voxel-by-voxel basis by calculating the difference between a 3D high-frequency spectral amplitude volume and a 3D low-frequency spectral amplitude volume. In still other embodiments, the voxel-by-voxel computations may be supplemented by first calculating an average over a portion of voxels in either, or both, a 3D low-frequency and a 3D high-frequency spectral amplitude volume. An average may be defined as, without limitation, the mean, or, trimmed mean, or median or harmonic average.

Figure 4A:
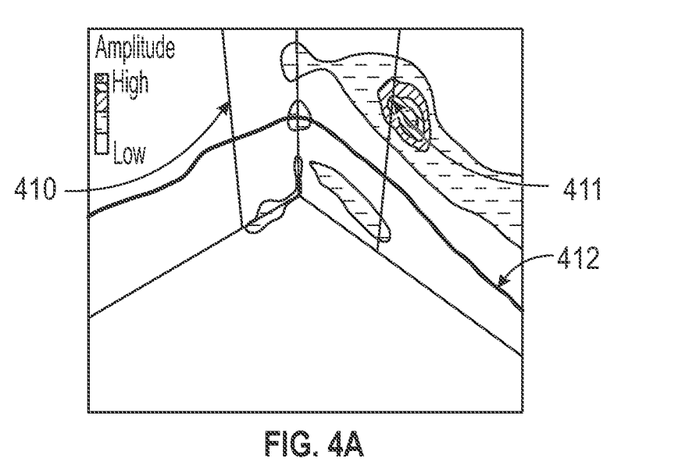
FIGS. 4A, 4B, and 4C show isofrequency spectral amplitude volumes in accordance with one or more embodiments.
Figure 4B:
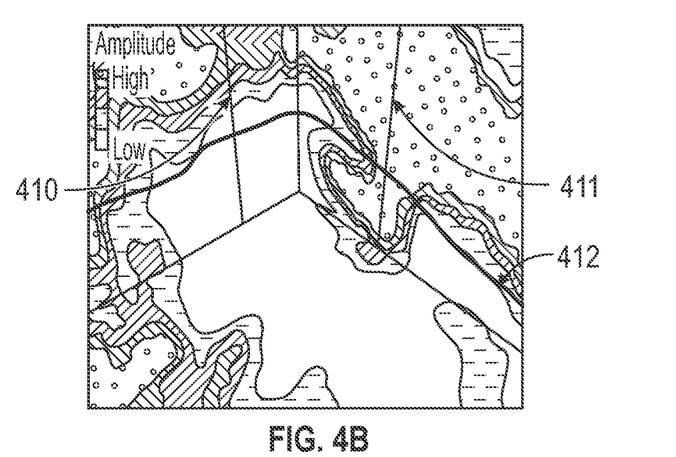
Figure 4C:
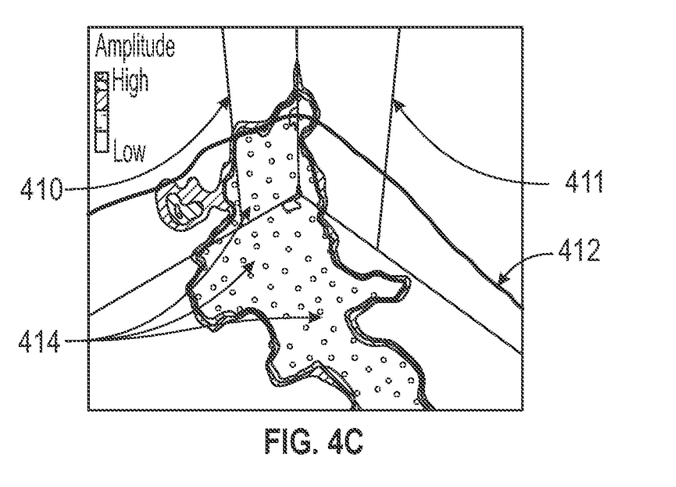

In Block 350, according to some embodiments, the location of gas within the reservoir may be determined. In some embodiments, the location of gas may be indicated by values of the attribute above a threshold value. In some embodiments, the location of gas may be indicated by values of the attribute below a threshold value. The threshold values may be user determined, or may be calculated based upon the range of values in the attribute volume FIGS. 4A, 4B, and 4C show isofrequency spectral amplitude volumes in accordance with one or more embodiments. As an example, FIG. 4A depicts a low-frequency spectral amplitude volume. Three orthogonal intersecting planes through the spectral amplitude volume are shown. The shading of FIG. 4A represents the spectral amplitude values on the three intersecting orthogonal planes. In addition, the reservoir top (412) and two wellbore are shown (410A, 410B). Wellbore A (410A) produces gas, and wellbore B (411B) produces water.

FIG. 4B depicts a high-frequency spectral amplitude volume for the same subterranean region of interest. The same three intersecting orthogonal planes and the same wellbore A (410A) and wellbore B (410B) are shown as are shown in FIG. 4A. FIG. 4C shows the attribute volume generated from the low-frequency spectral amplitude volume shown in FIG. 4A, divided on a voxel-by-voxel bases by the high-frequency spectral amplitude volume shown in FIG. 4B. FIG. 4C shows the same three intersecting orthogonal planes and the same wellbore A (410A) and wellbore B (410B) as are shown in FIG. 4A. The high values of the attribute, depicted by the dark shading indicate the locations of gas. A portion of the locations with high values of the attribute are intersected by wellbore A (410A), and wellbore A (410A) produces gas. No portion of the locations with high values of the attribute are intersected by wellbore B (410B), and wellbore B (410B) produces water, not gas.

FIGS. 4A, 4B, and 4C depict an example where the reservoir is deemed to be a "thick" reservoir. A thick reservoir is one in which the vertical extent of the reservoir is significantly larger than one seismic wavelength for the frequency value used for the high-frequency isofrequency spectral amplitude volume. In one or more embodiments, the reservoir may be three times thicker than one seismic wavelength. In other embodiments the reservoir may be five times thicker than one seismic wavelength. The embodiments shown in FIG. 3 may work better in thick reservoirs than in reservoirs which are not thick.

Figure 5A:
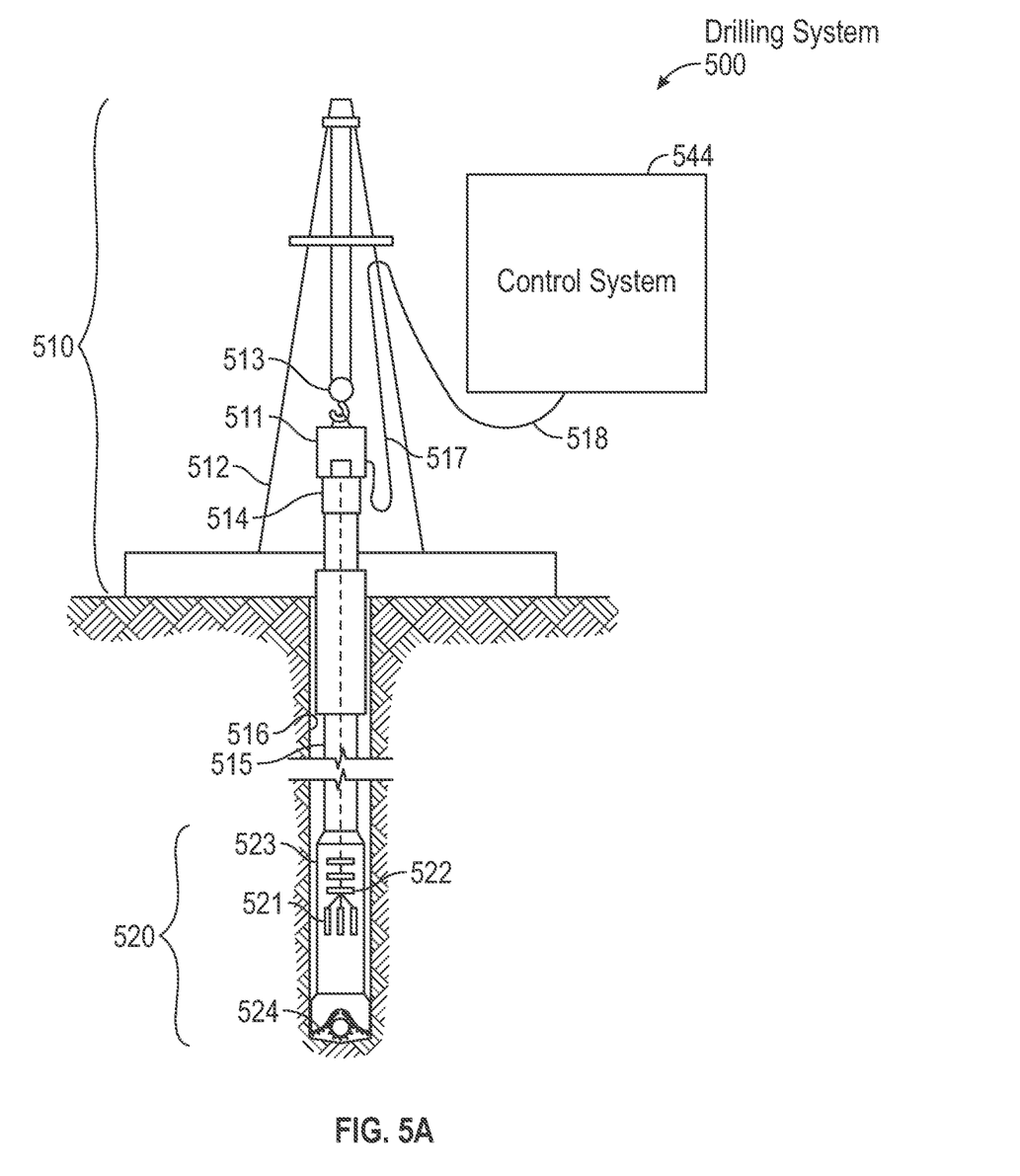
FIGS. 5A and 5B show systems in accordance with one or more embodiments.
Figure 5B:
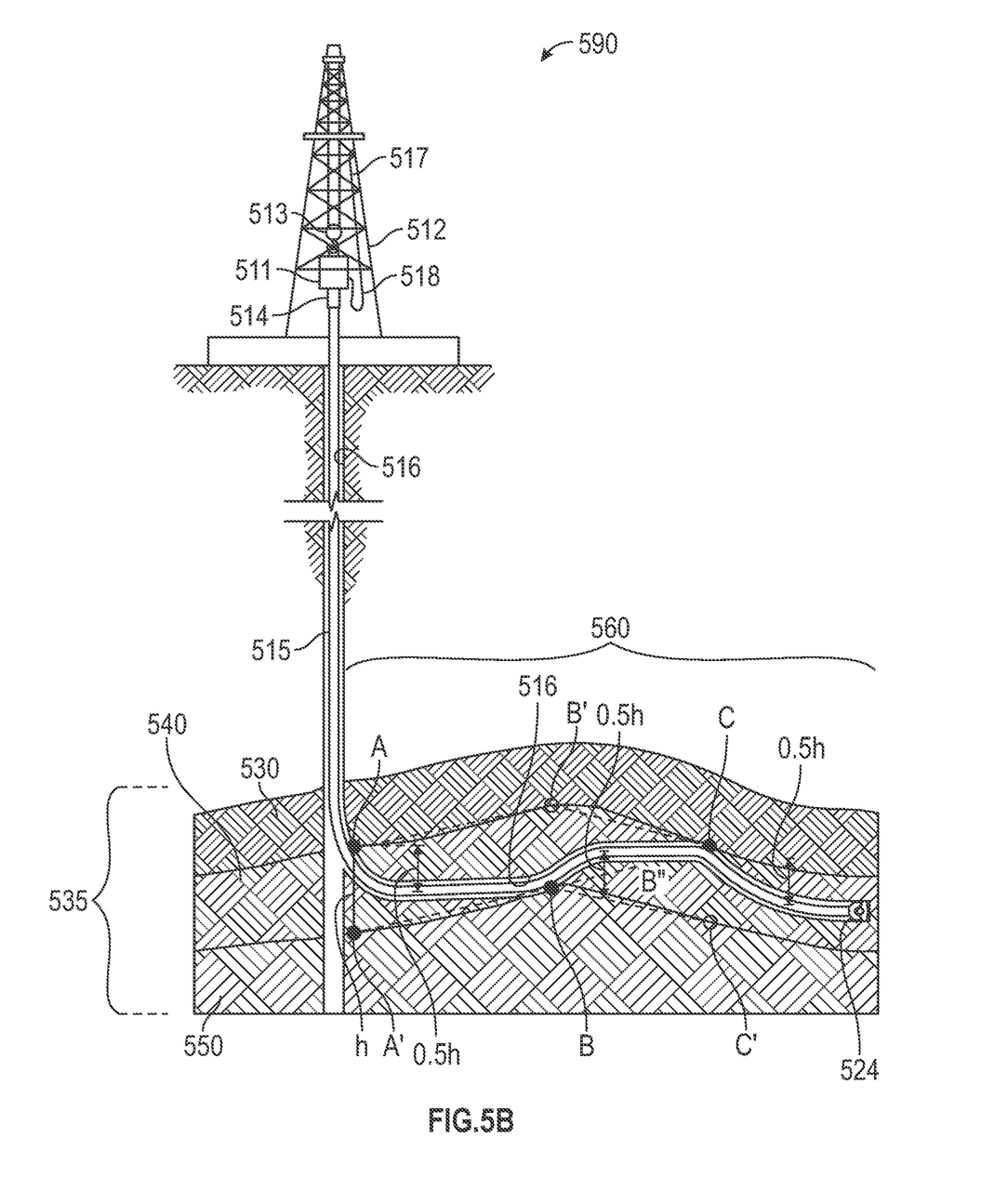

FIGS. 5A and 5B illustrate systems in accordance with one or more embodiments. As shown in FIG. 5A, a drilling system (500) may include a top drive drill rig (510) arranged around the setup of a drill bit logging tool (520). A top drive drill rig (510) may include a top drive (511) that may be suspended in a derrick (512) by a travelling block (513). In the center of the top drive (511), a drive shaft (514) may be coupled to a top pipe of a drill string (515), for example, by threads. The top drive (511) may rotate the drive shaft (514), so that the drill string (515) and a drill bit logging tool (520) cut the rock at the bottom of a wellbore (516). A power cable (517) supplying electric power to the top drive (511) may be protected inside one or more service loops (518) coupled to a control system (544). As such, drilling mud may be pumped into the wellbore (516) through a mud line, the drive shaft (514), and/or the drill string (515).

Moreover, when completing a well, casing may be inserted into the wellbore (516). The sides of the wellbore (516) may require support, and thus the casing may be used for supporting the sides of the wellbore (516). As such, a space between the casing and the untreated sides of the wellbore (516) may be cemented to hold the casing in place. The cement may be forced through a lower end of the casing and into an annulus between the casing and a wall of the wellbore (516). More specifically, a cementing plug may be used for pushing the cement from the casing. For example, the cementing plug may be a rubber plug used to separate cement slurry from other fluids, reducing contamination and maintaining predictable slurry performance. A displacement fluid, such as water, or an appropriately weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 5A, sensors (521) may be included in a sensor assembly (523), which is positioned adjacent to a drill bit (524) and coupled to the drill string (515). Sensors (521) may also be coupled to a processor assembly (523) that includes a processor, memory, and an analog-to-digital converter (522) for processing sensor measurements. For example, the sensors (521) may include acoustic sensors, such as accelerometers, measurement microphones, contact microphones, and hydrophones. Likewise, the sensors (521) may include other types of sensors, such as transmitters and receivers to measure resistivity, gamma ray detectors, etc. The sensors (521) may include hardware and/or software for generating different types of well logs (such as acoustic logs or density logs) that may provide well data about a wellbore, including porosity of wellbore sections, gas saturation, bed boundaries in a geologic formation, fractures in the wellbore or completion cement, and many other pieces of information about a formation. If such well data is acquired during drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (500) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

The control system (544) may be coupled to the sensor assembly (523) in order to perform various program functions for up-down steering and left-right steering of the drill bit (524) through the wellbore (516). More specifically, the control system (544) may include hardware and/or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (524) or drill string (515) relative to a boundary between different subsurface layers (e.g., overlying, underlying, and lateral layers of a pay zone) during drilling operations. In particular, measuring rock properties during drilling may provide the drilling system (500) with the ability to steer the drill bit (524) in the direction of desired hydrocarbon concentrations. As such, a geo steering system may use various sensors located inside or adjacent to the drilling string (515) to determine different rock formations within a wellbore's path. In some geosteering systems, drilling tools may use resistivity or acoustic measurements to guide the drill bit (524) during horizontal or lateral drilling.

Turning to FIG. 5B, FIG. 5B illustrates some embodiments for steering a drill bit through a lateral pay zone using a geosteering system (590). As shown in FIG. 5B, the geosteering system (590) may include the drilling system (500) from FIG. 5A. In particular, the geosteering system (590) may include functionality for monitoring various sensor signatures (e.g., an acoustic signature from acoustic sensors) that gradually or suddenly change as a wellbore path traverses a cap rock (530), a pay zone (540), and a bed rock (550). Because of the sudden change in lithology between the cap rock (530) and the pay zone (540), for example, a sensor signature of the pay zone (540) may be different from the sensor signature of the cap rock (530). When the drill bit (524) drills out of the pay zone (540) into the cap rock (530), a detected amplitude spectrum of a particular sensor type may change suddenly between the two distinct sensor signatures. In contrast, when drilling from the pay zone (540) downward into the bed rock (550), the detected amplitude spectrum may gradually change.

During the lateral drilling of the wellbore (516), preliminary upper and lower boundaries of a formation layer's thickness may be derived from a geophysical survey and/or an offset well obtained before drilling the wellbore (516). If a vertical section (535) of the well is drilled, the actual upper and lower boundaries of a formation layer (i.e., actual pay zone boundaries (A, A')) and the pay zone thickness (i.e., A to A') at the vertical section (535) may be determined. Based on this well data, an operator may steer the drill bit (524) through a lateral section (560) of the wellbore (516) in real time. In particular, a logging tool may monitor a detected sensor signature proximate the drill bit (524), where the detected sensor signature may continuously be compared against prior sensor signatures, e.g., of the cap rock (530), pay zone (540), and bed rock (550), respectively. As such, if the detected sensor signature of drilled rock is the same or similar to the sensor signature of the pay zone (540), the drill bit (524) may still be drilling in the pay zone (540). In this scenario, the drill bit (524) may be operated to continue drilling along a planned wellbore path and at a predetermined distance (0.5*h*) from a boundary of a formation layer. If the detected sensor signature is same as or similar to the prior sensor signatures of the cap rock (530) or the bed rock (550), respectively, then the control system (544) may determine that the drill bit (524) is drilling out of the pay zone (540) and into the upper or lower boundary of the pay zone (540). At this point, the vertical position of the drill bit (524) at this lateral position within the wellbore (516) may be determined and the upper and lower boundaries of the pay zone (540) may be updated, (for example, positions B and C in FIG. 5B). In some embodiments, the vertical position at the opposite boundary may be estimated based on the predetermined thickness of the pay zone (540), such as positions B' and C'.

While FIGS. 5A, and 5B shows various configurations of components, other configurations may be used without departing from the scope of the disclosure. For example, various components in FIGS. 5A, and 5B may be combined to create a single component. As another example, the functionality performed by a single component may be performed by two or more components.

Figure 6:
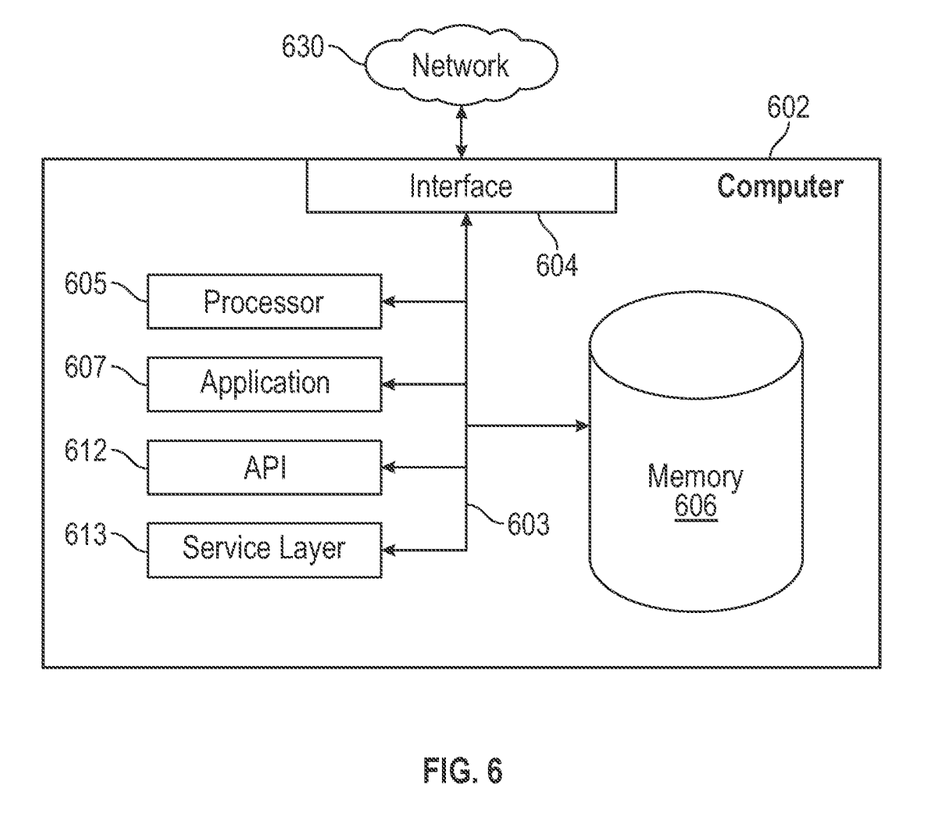
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
   transforming, by a seismic processor, a relative amplitude preserved 3D seismic volume acquired in a time-domain into a plurality of isofrequency volumes;
   extracting, by the seismic processor, from the plurality of isofrequency volumes, a first isofrequency spectral amplitude volume and a second isofrequency spectral amplitude volume;
   determining, by the seismic processor, an attribute volume from the first isofrequency spectral amplitude volume and the second isofrequency spectral amplitude volume by determining a product of a value of at least one voxel in the first isofrequency spectral amplitude volume and a value of at least one voxel in the second isofrequency spectral amplitude volume;
   determining, by the seismic processor, a location of gas in a subterranean region of interest based on the attribute volume; and
   drilling a wellbore to the location of gas using a drilling system.

2. The method of claim 1, wherein the relative amplitude preserved 3D seismic volume acquired in the time-domain is a Pre-Stack Time Migration volume.

3. The method of claim 1, wherein the relative amplitude preserved 3D seismic volume acquired in the time-domain is a Post-Stack Time Migration volume.

4. The method of claim 1, wherein the relative amplitude preserved 3D seismic volume acquired in the time-domain is a Pre-Stack Depth Migration volume.

5. The method of claim 1, wherein the transforming comprises a continuous wavelet transform.

6. The method of claim 1, wherein the transforming comprises a discrete wavelet transform.

7. The method of claim 1, wherein transforming the relative amplitude preserved 3D seismic volume acquired in the time-domain comprises applying a spatially-smoothing operator to the plurality of isofrequency volumes.

8. The method of claim 1, wherein transforming the relative amplitude preserved 3D seismic volume acquired in the time-domain comprises applying a filter to the plurality of isofrequency volumes.

9. The method of claim 1, wherein determining the attribute volume comprises calculating a ratio of the value of the at least one voxel in the first isofrequency spectral amplitude volume to the value of the at least one voxel in the second isofrequency spectral amplitude volume.

10. The method of claim 1, wherein determining the attribute volume comprises calculating a difference between the value of the at least one voxel in the first isofrequency spectral amplitude volume and the value of the at least one voxel in the second isofrequency spectral amplitude volume.

11. A system, comprising:
a seismic processor capable of executing instructions stored in a computer-readable medium that cause the seismic processor to perform functions comprising:
transforming a relative amplitude preserved 3D seismic volume acquired in a time-domain into a plurality of isofrequency volumes,
extracting, from the plurality of isofrequency volumes, a first isofrequency spectral amplitude volume and a second isofrequency spectral amplitude volume,
determining an attribute volume from the first isofrequency spectral amplitude volume and the second isofrequency spectral amplitude volume by determining a product of a value of at least one voxel in the first isofrequency spectral amplitude volume and a value of at least one voxel in the second isofrequency spectral amplitude volume, and
determining a location of gas in a subterranean region of interest based on the attribute volume; and
a drilling system for drilling a wellbore to the location of gas.

12. The system of claim 11, wherein the transforming comprises a continuous wavelet transform.

13. The system of claim 11, wherein calculating the attribute volume comprises calculating a ratio of the value of the at least one voxel in the first isofrequency spectral amplitude volume to the value of the at least one voxel in the second isofrequency spectral amplitude volume.

14. The system of claim 11, wherein the transforming comprises a discrete wavelet transform.

* * * * *